(12) United States Patent
Yamasaki (10) Patent No.: US 8,189,682 B2
(45) Date of Patent: May 29, 2012

(54) DECODING SYSTEM AND METHOD FOR ERROR CORRECTION WITH SIDE INFORMATION AND CORRELATION UPDATER

(75) Inventor: Takahiro Yamasaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 404 days.

(21) Appl. No.: 12/382,728

(22) Filed: Mar. 23, 2009

(65) Prior Publication Data

US 2009/0245372 A1   Oct. 1, 2009

(30) Foreign Application Priority Data

Mar. 27, 2008   (JP) .................. 2008-083654

(51) Int. Cl.
   *H04N 7/12*   (2006.01)
   *H04N 11/02*   (2006.01)
(52) U.S. Cl. .............. 375/240.25; 375/240.15
(58) Field of Classification Search ............. 375/240.15, 375/240.25
   See application file for complete search history.

(56) References Cited

U.S. PATENT DOCUMENTS

| 7,882,421 | B2 * | 2/2011 | Oguz et al. ............... 714/776 |
| 2009/0103606 | A1 * | 4/2009 | Lu et al. .................. 375/240.02 |
| 2009/0122868 | A1 * | 5/2009 | Chen et al. ............... 375/240.22 |
| 2009/0238270 | A1 * | 9/2009 | Nishi ........................ 375/240.12 |
| 2010/0239003 | A1 * | 9/2010 | Lakus-Becker et al. . 375/240.12 |

OTHER PUBLICATIONS

Aaron et al., 'Transform-Domain Wyner-Ziv Codec for Video', Proc. SPIE Visual Communications and Image Processing, San Jose, California, 2004.

Artigas et al., 'Iterative Generation of Motion-Compensated Side Information for Distributed Video Coding', Proc. IEEE International Conference on Image Processing, 2005, pp. 833-836.

Adikari et al., 'A Sequential Motion Compenation Refinement Technique for Distributed Video Coding of Wyner-Ziv Frames', Proc. IEEE International Conference on Image Processing, 2006, pp. 597-600.

Catarina Brites et al., "Studying Temporal Correlation Noise Modeling for Pixel Based Wyner-Ziv Video Coding", 2006 IEEE International Conference on Image Processing, IEEE Oct. 8, 2006, pp. 273-276.

* cited by examiner

*Primary Examiner* — Jay Patel
*Assistant Examiner* — Richard Torrente
(74) *Attorney, Agent, or Firm* — Rabin & Berdo, P.C.

(57) ABSTRACT

A decoding system generates a predicted image, receives error correcting information encoding an original image, and uses the predicted image and the error correcting information to carry out a multi-stage decoding process that reconstructs the original image by correcting prediction errors in the predicted image. This process uses correlation information representing an assumed correlation between the predicted image and the original image. As the decoding process proceeds, the correlation information is updated to reflect assumed or inferred changes in the correlation between the predicted image and the original image. Updating the correlation information permits more efficient coding by enabling the original image to be reconstructed to an acceptable level of image quality with less error correcting information.

19 Claims, 8 Drawing Sheets

DECODING SYSTEM AND METHOD FOR ERROR CORRECTION WITH SIDE INFORMATION AND CORRELATION UPDATER

BACKGROUND OF THE INVENTION

1. Field of the Invention

The present invention relates to a decoding system and method applicable to, for example, distributed video coding.

2. Description of the Related Art

Distributed video coding (DVC) is a coding method that has been attracting considerable attention (see. Aaron et al., 'Transform-Domain Wyner-Ziv Codec for Video', *Proc. SPIE Visual Communications and Image Processing*, 2004). In DVC coding, an image is encoded by an intraframe coding process that produces data bits and parity bits and the parity bits are sent to the decoder. The decoder decodes the parity bits with reference to a predicted image generated by, for example, interpolation or extrapolation from other frames.

More specifically, a video image sequence is divided into Wyner-Ziv frames, to which the above coding and decoding process is applied, and key frames, to which conventional intraframe coding and decoding are applied. A discrete cosine transform (DCT) is used to transform each Wyner-Ziv frame to the coefficient domain, the coefficients are grouped into bands, the coefficients in the k-th band are quantized by a $2^{M_k}$-level quantizer, the quantized coefficients ($q_k$) are expressed in fixed numbers of bits, and the bit planes are extracted and supplied to a Slepian-Wolf encoder, which is a type of turbo encoder that produces the data bits and parity bits. The parity bits are stored in a buffer for transmission to the decoder. The data bits are discarded (as implied but not explicitly shown by Aaron et al.).

The decoder generates the predicted image, applies a DCT to convert the predicted image to the coefficient domain, groups the coefficients into bands, and inputs the coefficients in each band as side information to a Slepian-Wolf decoder (a type of turbo decoder). The Slepian-Wolf decoder requests the parity bits it needs as error-correcting information to correct prediction errors in the side information, thereby decoding the parity bits. If necessary, further parity bits can be requested and the turbo decoding process can be repeated until a satisfactory decoded result is obtained. An inverse discrete cosine transform (IDCT) is then used to reconstruct the image.

The coding efficiency in this process can be improved by updating the side information during the decoding process to improve the accuracy of the side information, so that there are fewer errors and fewer parity bits are needed to correct them. A known technique is to estimate motion vectors from the result of one stage of the Slepian-Wolf decoding process and then generate new side information for the next stage by using the motion vectors to perform motion compensation.

A scheme of this type in which the successive stages are successive iterations of the decoding of a frame is described by Artigas et al. in 'Iterative Generation of Motion-Compensated Side Information for Distributed Video Coding', *Proc. IEEE International Conference on Image Processing*, 2005, pp. 833-836.

An alternative scheme in which the successive stages are the decoding of successive bit planes is described by Adikari et al. in 'A Sequential Motion Compensation Refinement Technique for Distributed Video coding of Wyner-Ziv Frames', *Proc. IEEE International Conference on Image Processing*, 2006, pp. 597-600.

A problem in both of these schemes is that the decoding process assumes a fixed statistical correlation between the side information and the data bits that were generated (and discarded) in the encoder. As the decoding process proceeds and the side information becomes increasingly accurate, the assumed correlation becomes increasingly incorrect. As a result, the decoder may request more parity bits than necessary, and there is the possibility of inadvertent 'correction' of non-errors. The coding efficiency is therefore impaired because extra parity bits are needed to obtain a decoded image of acceptable quality.

SUMMARY OF THE INVENTION

An object of the present invention is to provide a decoding system and method that require fewer parity bits to obtain a decoded image of acceptable quality.

The invention provides a novel decoding system that receives error correcting information as coded data representing an original image from an encoding system. A predictor in the decoding system generates a predicted image without using the received error correcting information. A decoder then uses the error correcting information and correlation information representing an assumed correlation between the predicted image and the original image to perform a multi-stage decoding process that corrects prediction errors in the predicted image, and outputs a corrected image at each stage of the multi-stage decoding process.

A predicted image updater uses the corrected image output by the decoder to update the predicted image.

A correlation updater updates the correlation information and supplies the updated correlation information to the decoder for use in the next stage of the multi-stage decoding process.

By updating the correlation information, the novel decoding system is able to continue to use appropriate correlation information as the decoder proceeds through successive iterations of the decoding process, or decodes successive bit planes in the image. The result is that less error correcting information is needed to obtain an acceptable decoded image, e.g., fewer parity bits are needed, so the coding efficiency is improved.

The invention also provides a decoding method that operates as described above, and a machine-readable medium storing instructions that can be executed by a computing device to carry out this decoding method.

DETAILED DESCRIPTION OF THE INVENTION

Embodiments of the invention will now be described with reference to the attached drawings, in which like elements are indicated by like reference characters. The embodiments are decoding systems for use in a distributed video coding environment including a transmitting apparatus (not shown) that encodes and transmits video frames, providing both encoded key frames and parity bits of Wyner-Ziv frames disposed between the key frames.

First Embodiment

Figure 1:
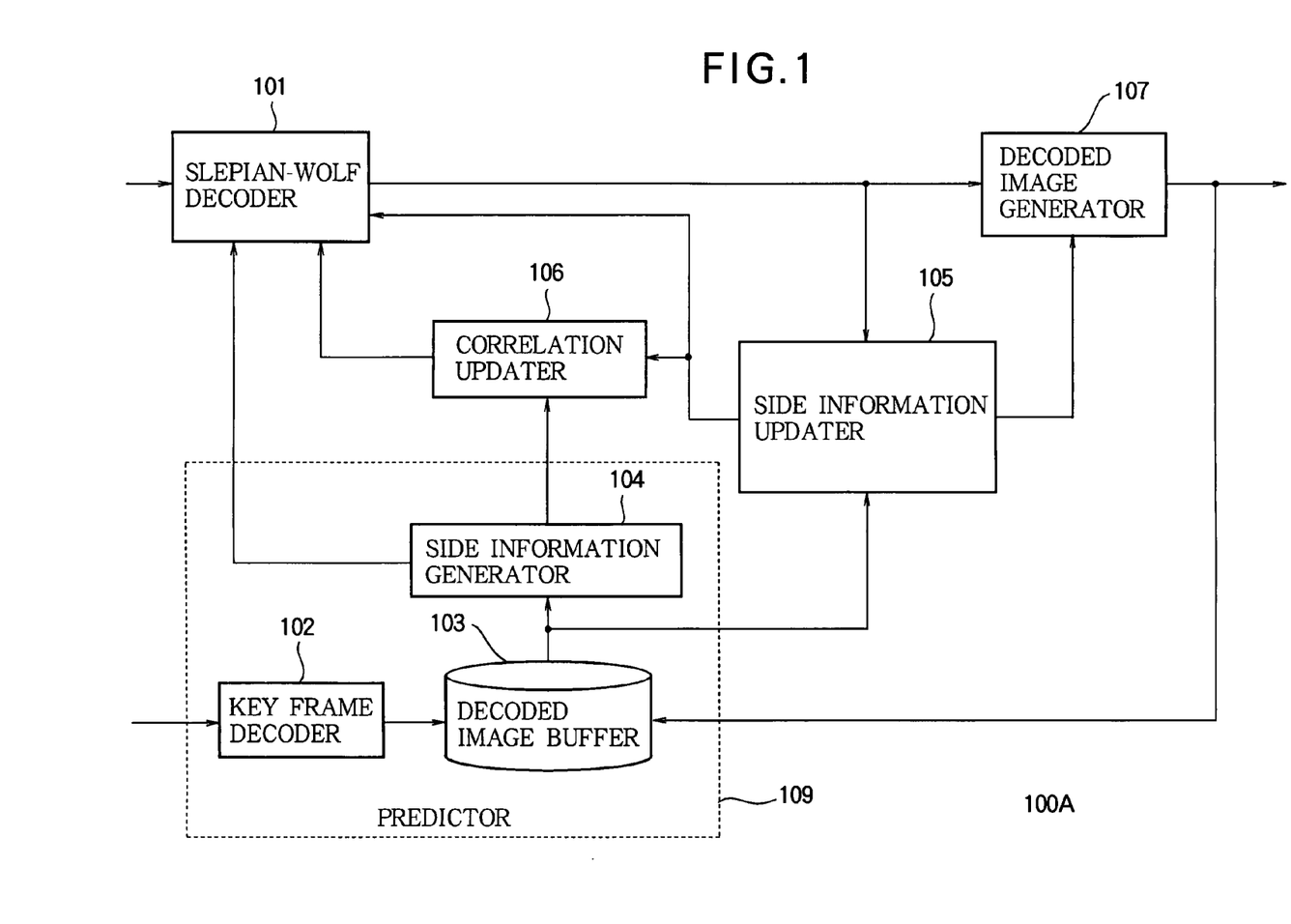
FIG. 1 is a block diagram of a decoding system illustrating a first embodiment of the invention.

Referring to FIG. 1, the decoding apparatus 100A in the first embodiment comprises at least a Slepian-Wolf decoder 101, a key frame decoder 102, a decoded image buffer 103, a side information generator 104, a side information updater 105, a correlation updater 106, and a decoded image generator 107. The key frame decoder 102, decoded image buffer 103, and side information generator 104 constitute a predictor 109.

The key frame decoder 102 receives and decodes key frame data supplied from the transmitting apparatus, and stores the decoded key frame data in the decoded image buffer 103.

The decoded image buffer 103 provides the stored key frame data to the side information generator 104 and side information updater 105.

The side information generator 104 generates side information for Wyner-Ziv frames from the key frame data stored in the decoded image buffer 103, and provides the side information to the Slepian-Wolf decoder 101 and correlation updater 106. The side information represents predicted image frames corresponding to the Wyner-Ziv frames. The side information generator 104 may simply interpolate average values between the preceding and following key frames, or it may detect motion vectors and perform motion compensation as described by Ascenso et al. in 'Improving Frame Interpolation with Spatial Motion Smoothing for Pixel Domain Distributed Video Coding', *Proc. 5th EURASIP Conference on Speech and Image Processing, Multimedia Communications and Services*, 2005.

The Slepian-Wolf decoder 101 receives parity bits of Wyner-Ziv frames (original images) from the transmitting apparatus and the corresponding side information from the side information generator 104, carries out a turbo decoding process on the side information and the parity bits to correct prediction errors in the side information, thereby in effect decoding the parity bits, and outputs corrected frames of side information to the side information updater 105 and decoded image generator 107. After the first iteration, instead of the side information provided by the side information generator 104, the Slepian-Wolf decoder 101 uses updated side information provided by the side information updater 105.

In the decoding process, the Slepian-Wolf decoder 101 makes use of correlation information describing a correlation between the side information and the original Wyner-Ziv frame. Since the Slepian-Wolf decoder 101 does not have access to the original Wyner-Ziv frame, it uses an assumed correlation or bases the correlation on the key frames from which the side information was generated, as described below. Alternatively, the correlation may be based on processed side information, that is, on a predicted image frame on which certain processing has been carried out.

The side information updater 105 uses the corrected Wyner-Ziv frames received from the Slepian-Wolf decoder 101 to update the side information, and provides the updated side information to the Slepian-Wolf decoder 101, correlation updater 106, and decoded image generator 107.

The correlation updater 106 updates the correlation information by calculating a new correlation between the updated side information and the key frame data (alternatively, between the updated side information and predicted image data on which certain processing has been carried out).

The decoded image generator 107 generates a decoded image from a the provisionally decoded data output by the Slepian-Wolf decoder 101 and the updated side information, and outputs the decoded image to, for example, an image display device (not shown).

The operation of the decoder in the first embodiment will now be described with reference to the flowchart shown in FIGS. 2 to 4.

Figure 2:
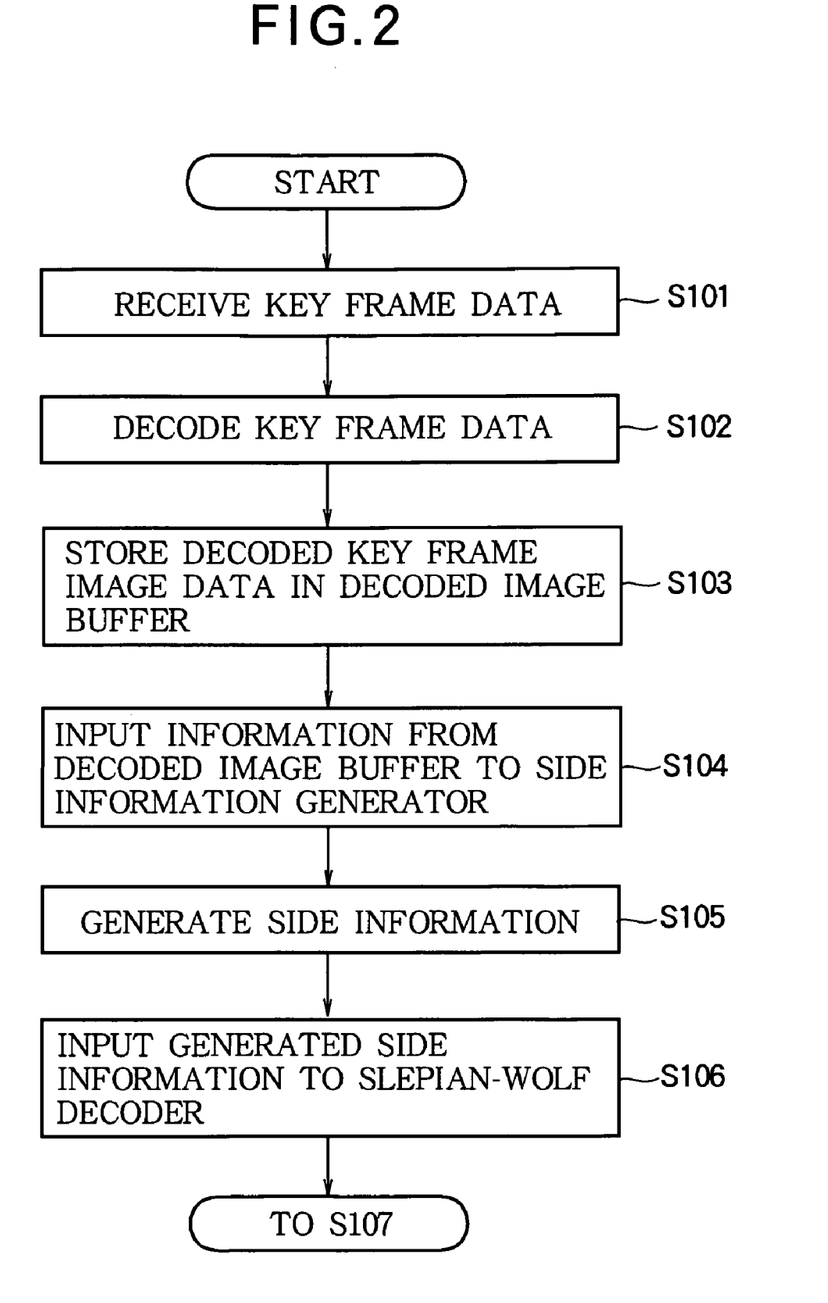
FIGS. 2, 3, and 4 form a flowchart illustrating the decoding operation in the first embodiment.

Referring to FIG. 2, first the key frame decoder 102 receives encoded key frame data from the transmitting apparatus (step S101), decodes the encoded key frame data to obtain key frame image data (step S102), and stores the key frame image data in the decoded image buffer 103 (step S103).

The side information generator 104 fetches the key frames preceding and following a Wyner-Ziv frame from the decoded image buffer 103 (step S104) and generates side information for the Wyner-Ziv frame by one of the methods described above (step S105).

The side information generated by the side information generator 104, which can be regarded as an erroneously predicted version of the original image data, is supplied to the Slepian-Wolf decoder 101 (step S106), together with information representing an assumed correlation with the original Wyner-Ziv frame (step s107). The Slepian-Wolf decoder 101 also receives the parity bits generated by the encoder from the original Wyner-Ziv frame (step S108).

The Slepian-Wolf decoder 101 now decodes the Wyner-Ziv frame by using the parity bits and the correlation information to correct the prediction errors (step S109). The correlation information represents an assumed probability distribution of the prediction errors, and is used to convert the input data from hard data to the soft data required for turbo decoding. The result of this decoding process is a set of provisionally decoded data representing a corrected image.

More specifically, the prediction errors are assumed to conform to a residual Laplacian model; that is, a histogram of the differences between the original image and the predicted image is assumed to have a Laplacian distribution. It is known that the Laplacian distribution is generally a good approximation to the actual error histogram. The scale parameter of the Laplacian distribution, indicated below by the symbol $\alpha$, can be used as the correlation information.

Various methods can be used to calculate the parameter $\alpha$. In a first applicable method, the value of $\alpha$ is calculated in advance by the method given by Artigas et al. in the reference cited above. In a second applicable method, described by Brites et al. in 'Studying Temporal Correlation Noise Modeling For Pixel Based Wyner-Ziv Video Coding', *Proc. IEEE International Conference on Image Processing*, October 2006, pp. 273-276, the value of $\alpha$ is calculated from the preceding and following key frames, more specifically from the residual difference between forward and backward motion compensation. In a third applicable method, a suitable initial value of the parameter $\alpha$ is simply assumed, and improved values are obtained in successive iterations of the decoding process.

The provisionally decoded data obtained by the Slepian-Wolf decoder 101 in step S109 are output to the decoded image generator 107 (step S110), which reconstructs a provisionally decoded image (step S108). The decoded image generator 107 then decides whether the image quality of the provisionally decoded image exceeds a predetermined value or, failing that, whether the Slepian-Wolf decoding process has been iterated a predetermined number of times (step S112). If either of these conditions is satisfied, the decoding of the Wyner-Ziv frame is terminated and the decoded frame is output for display. If neither condition is met, the decoding process proceeds to step S113.

In a variation of the first embodiment, the decoding process proceeds to step S113 unless both of the above conditions are met, so that decoding continues for at least the predetermined number of iterations and does not end until the predetermined image quality has been obtained.

In another variation, only one of these two conditions is used as the condition for terminating the decoding process.

In step S113, the decoded data obtained by the Slepian-Wolf decoder 101 are supplied to the side information updater 105 and the correlation information is updated as follows.

First, the provisionally decoded image obtained by the decoded image generator 107 is stored in the decoded image buffer 103 and the side information updater 105 fetches the preceding and following already decoded frames (e.g., key frames) from the decoded image buffer 103 (step S114).

Next, the side information updater 105 updates the side information (step S115). In one exemplary updating method, the side information updater 105 estimates motion vectors from the provisionally decoded image and the preceding and following frames, and then uses a motion compensation technique to generate new side information. Since the motion vectors from which the new side information are generated are based on the decoded data output by the Slepian-Wolf decoder 101 in the most recent decoding iteration, they are in general more accurate than the motion vectors used in previous iterations, so the updated side information more closely approximates the original frame.

The side information updater 105 supplies the updated side information to the correlation updater 106 (step S116), which now updates the correlation information (step S117). When the residual Laplacian model is used, this update can be carried out as follows.

The scale parameter $\alpha$ of the Laplacian distribution is related to the variance $\sigma^2$ of the distribution as follows.

$$\alpha^2 = 2/\sigma^2$$

The scale parameter $\alpha$ that defines the correlation can accordingly be obtained from the variance. Three exemplary methods of calculating the variance are as follows.

In a first exemplary method the variance is reduced according to a fixed rule at each decoding iteration, on the assumption that the updated side information will be a better approximation to the original image than the side information used previously, so the differences between the side information and original image data, or the key frame data, will be more clustered toward zero.

In a second exemplary method, the amount by which the variance is reduced is calculated from the amount by which the motion vectors before and after the update of the side information have changed, on the assumption that a larger change in the motion vectors indicates a greater improvement in the accuracy of the side information.

In a third exemplary method, the new value of the variance is calculated by the method described by Brites et al. in the reference cited above, using residual differences between forward and backward motion compensation.

Figure 3:
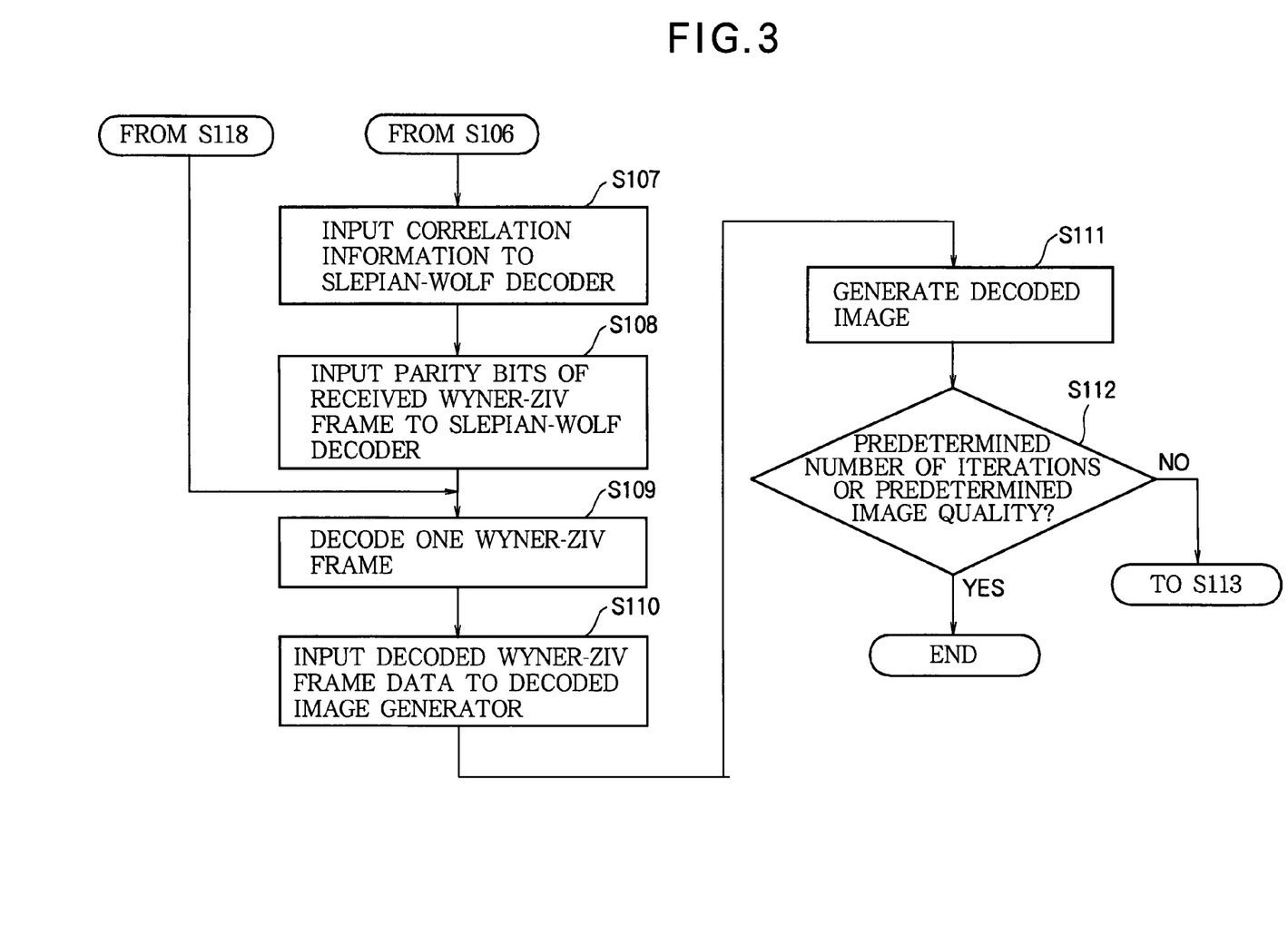
Figure 4:
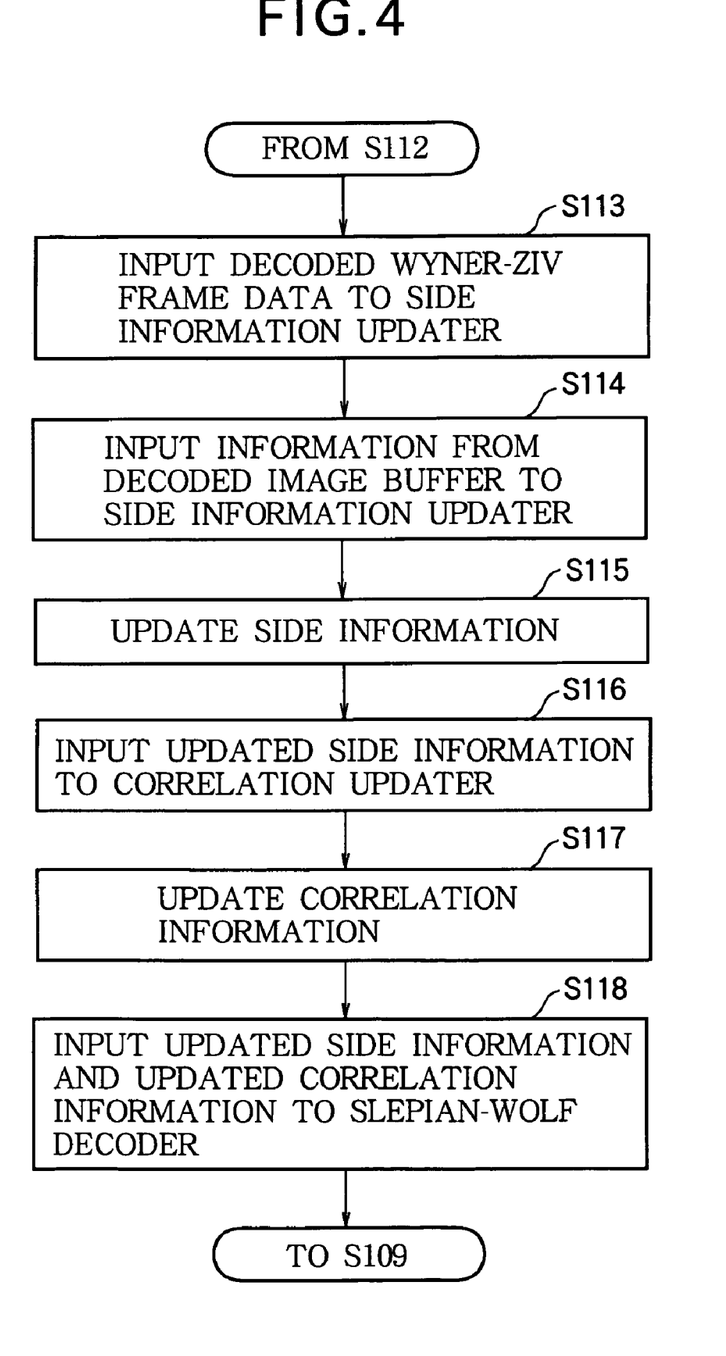

After the correlation parameter has been updated in step S117 as described above, the Slepian-Wolf decoder 101 receives the updated side information from the side information updater 105 and the updated correlation from the correlation updater 106 (step S118), and the decoding process returns to step S109 in FIG. 3 to begin the next decoding iteration.

The decoding process ends when a predetermined number of iterations have been carried out or a predetermined image quality has been obtained, as described above.

Compared with the conventional decoding methods that use the same correlation parameter in all decoding iterations, the first embodiment, which adjusts the correlation parameter at each iteration, is based on better correlation information and accordingly requires fewer parity bits. Consequently, the coding efficiency is improved. This is particularly true if the second or third exemplary method of calculating the variance is used, because the correlation parameter is based on the actual side information before and after the update.

Second Embodiment

The second embodiment differs from the first embodiment in that the side information and correlation are updated after the decoding of each bit plane.

Figure 5:
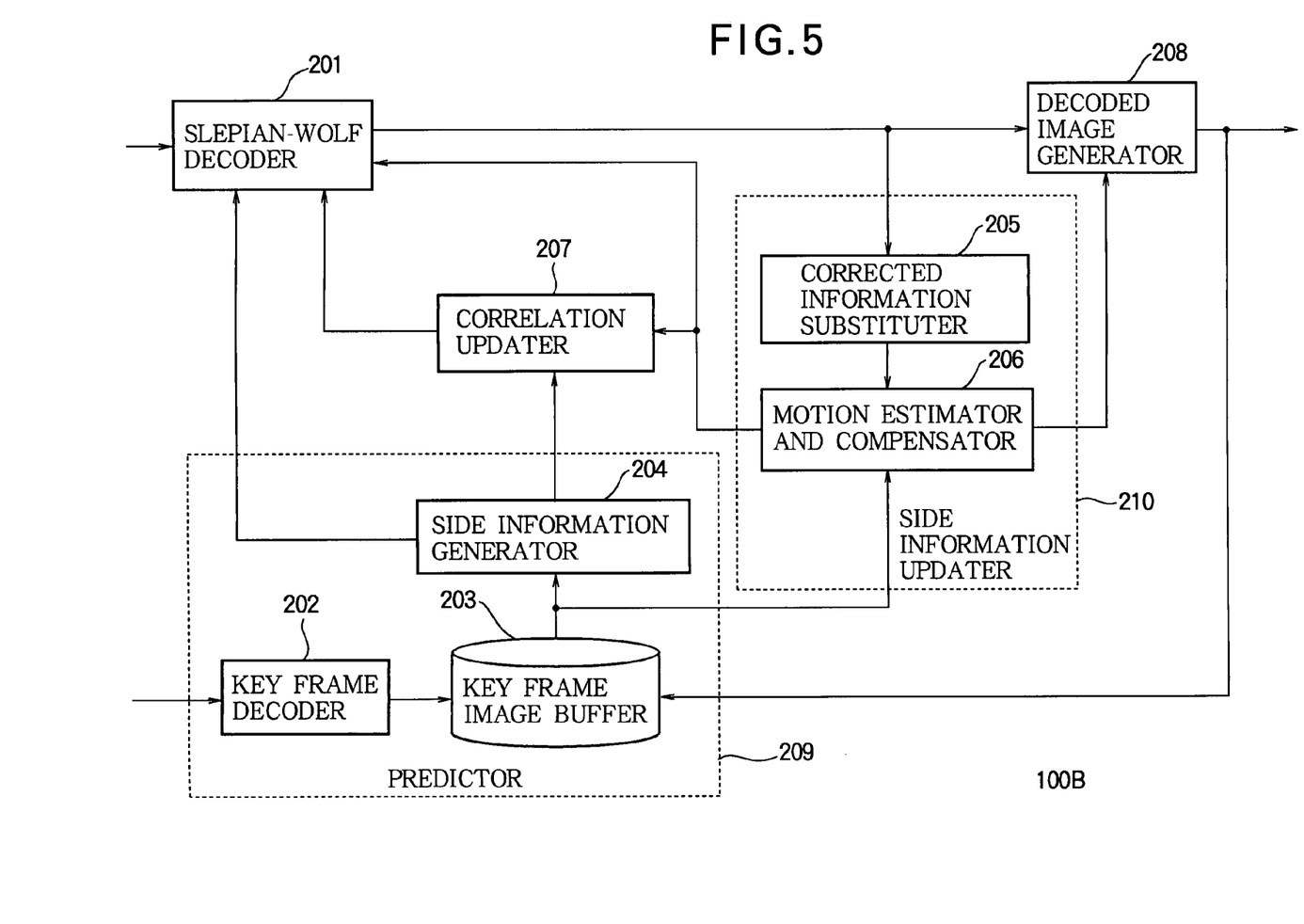
FIG. 5 is a block diagram of a decoding system illustrating a second embodiment of the invention.

Referring to FIG. 5, the decoding apparatus 100B in the first embodiment comprises at least a Slepian-Wolf decoder 201, a key frame decoder 202, a key frame image buffer 203, a side information generator 204, a corrected information substituter 205, a motion estimator and compensator 206, a correlation updater 207, and a decoded image generator 208. The key frame decoder 202, key frame image buffer 203, and side information generator 204 constitute a predictor 209. The corrected information substituter 205 and motion estimator and compensator 206 constitute a side information updater 110.

The key frame decoder 202 receives and decodes key frame data supplied from the transmitting apparatus, and stores the decoded key frame data in the key frame image buffer 203.

The key frame image buffer 203 provides the stored key frame data to the side information generator 204 and motion estimator and compensator 206.

The side information generator 204 generates side information for Wyner-Ziv frames from the key frame data stored in the key frame image buffer 203 as described in the first embodiment, and provides the side information to the Slepian-Wolf decoder 201 and corrected information substituter 205. The side information comprises a plurality of bit planes, from a most significant bit (MSB) plane to a least significant bit (LSB) plane, which are supplied to the Slepian-Wolf decoder 201 one bit plane at a time.

The Slepian-Wolf decoder 201 performs Slepian-Wolf decoding one bit plane at a time, using side information obtained from the side information generator 204 or updated side information obtained from the motion estimator and compensator 206, correlation information obtained from the correlation updater 207, and parity bits received from the transmitting apparatus. The decoded bit planes are output to the corrected information substituter 205 and decoded image generator 208.

The corrected information substituter 205 uses the decoded bit planes output by the Slepian-Wolf decoder 201 to update bit planes in the side information received from the side information generator 204, and supplies the updated side information to the motion estimator and compensator 206.

The motion estimator and compensator 206 performs motion vector estimation and compensation, using key frame data obtained from the key frame image buffer 203 and the side information including the corrected bit planes supplied by the corrected information substituter 205, and supplies the updated side information to the Slepian-Wolf decoder 201, the correlation updater 207, and the decoded image generator 208.

The correlation updater 207 updates the assumed correlation between the updated side information and the original image, and supplies updated correlation information to the Slepian-Wolf decoder 201.

The decoded image generator 208 generates a decoded image from the decoded bit planes of a Wyner-Ziv frame and the updated side information and outputs the decoded image as in the first embodiment.

The operation of the decoder in the second embodiment will now be described with reference to the flowchart shown in FIGS. 6 to 8.

Figure 6:
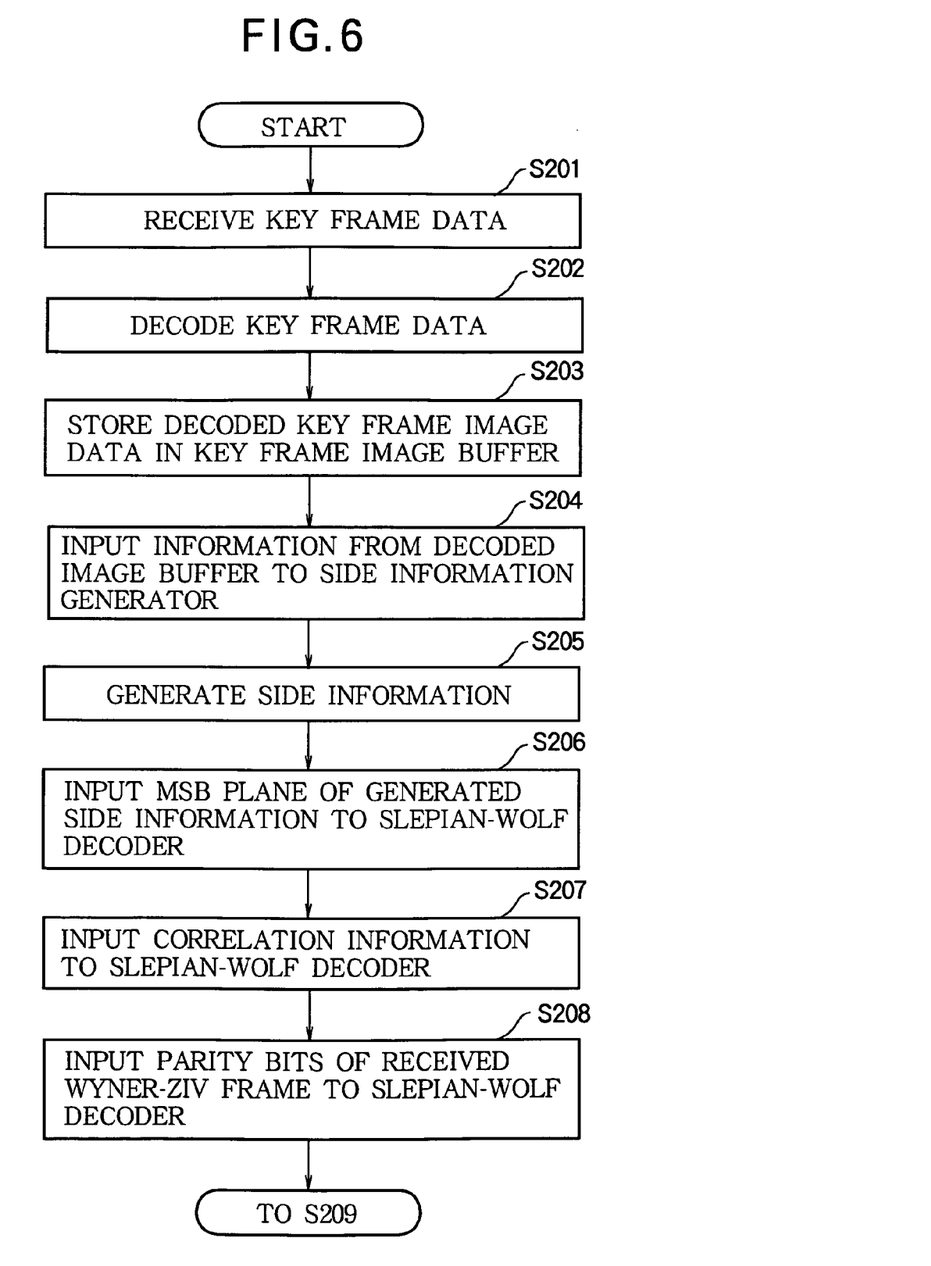
FIGS. 6, 7, and 8 form a flowchart illustrating the decoding operation in the second embodiment.

Referring to FIG. 6, first the key frame decoder 202 receives encoded key frame data from the transmitting apparatus (step S201), decodes the encoded key frame data to obtain key frame-image data (step S202), and stores the key frame image data in the key frame image buffer 203 (step S203), as in the first embodiment.

The side information generator 204 fetches the key frames preceding and following a Wyner-Ziv frame from the key frame image buffer 203 (step S204) and generates side information for the Wyner-Ziv frame by, for example, one of the methods described in the first embodiment (step S205).

First, the most significant bit plane of the side information is passed to the Slepian-Wolf decoder 201 (step S206), together with information representing an assumed correlation with the original Wyner-Ziv frame (step s207). The Slepian-Wolf decoder 201 also receives the parity bits generated by the encoder from the original Wyner-Ziv frame (step S208).

Figure 7:
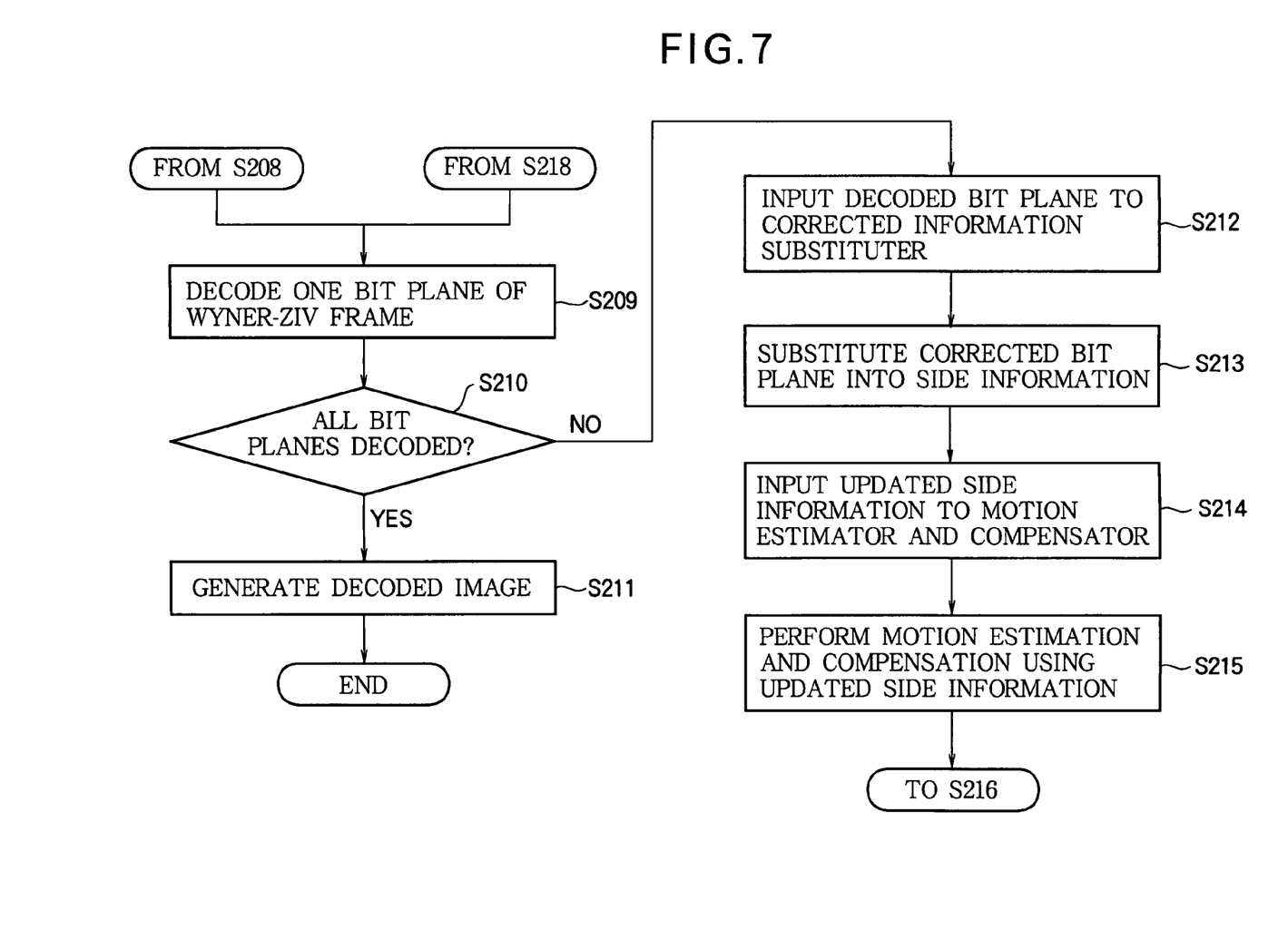

Referring to FIG. 7, the Slepian-Wolf decoder 201 uses the received side information, correlation information, and parity bits to decode one bit plane of the Wyner-Ziv frame, thereby correcting errors in the predicted values of the bit plane given in the side information (step S209). When step S209 is entered from step S208, the most significant bit (MSB) plane is decoded. The steps in FIGS. 7 and 8 form a loop, so step S209 in FIG. 7 may also be entered from step S218 in FIG. 8, in which case a lower bit plane is decoded.

Following step S209, a decision is made as to whether all bit planes have been decoded (step S210). If so, the decoded image generator 208 reconstructs the decoded image from the totality of the decoded bit planes (step S211) and the process ends.

If all bit planes have not yet been decoded (No in step S210), the corrected values of the bit plane obtained in step S209 are passed to the corrected information substituter 205 (step S212), which updates the corresponding bit plane of the side information by replacing the predicted values with the corrected values (step S213).

The updated side information is then passed to the motion estimator and compensator 206 (step S214) The motion estimator and compensator 206 fetches relevant information, such as the preceding and following decoded key frames, from the key frame image buffer 203, uses this information to perform motion vector estimation and compensation, and thereby further updates the side information (step S215).

The updated side information is now passed from the motion estimator and compensator 206 to the correlation updater 207 (step S216), which updates the correlation information (step S217) as described in the first embodiment, using the inverse-square relation between the scale parameter $\alpha$ and the variance ($\alpha^2 = 2/\sigma^2$). Any of the exemplary methods described in the first embodiment may be employed for this update.

The motion estimator and compensator 206 also supplies the next bit plane of the updated side information to the Slepian-Wolf decoder 201, and the correlation updater 207 supplies the updated correlation information to the Slepian-Wolf decoder 201 (step S218). The process now returns to step S209 in FIG. 7, and the Slepian-Wolf decoder 201 decodes the next bit plane.

Figure 8:
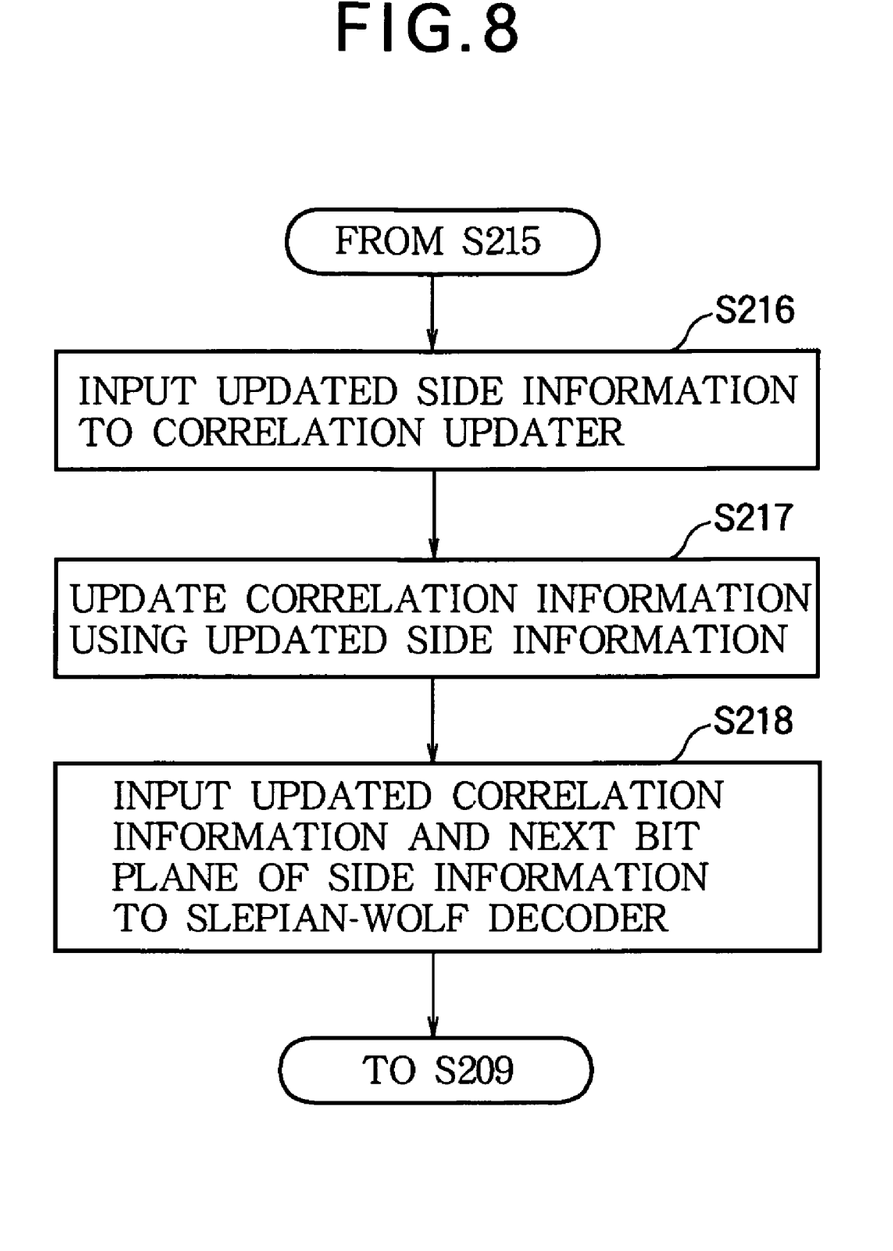

As the loop in FIGS. 7 and 8 is iterated, the bit planes are decoded one by one, typically in order from the most significant bit plane to the least significant bit plane. When all bit planes have been decoded, the image of the Wyner-Ziv frame is reconstructed and the process ends, as described above (step S211).

In the second embodiment, the benefit of updating the correlation information is obtained as in the first embodiment, in that the decoding of each successive bit plane benefits from the improved correlation information obtained by the decoding of the preceding bit planes. Accordingly, prediction errors in the lower bit planes can be corrected with fewer parity bits, so the frame as a whole can be decoded with a smaller number of parity bits.

The invention is not limited to the exemplary methods of calculating the updated correlation parameter given in the first embodiment. Any method that updates the correlation information as the decoding of a single Wyner-Ziv frame proceeds through successive iterations or successive bit planes may be employed.

The first and second embodiments may be combined. For example, the correlation information may be updated both between successive iterations in the decoding of each bit plane, and between the decoding of successive bit planes.

The invention may be practiced in hardware, software, or a combination thereof. All of the blocks shown in FIGS. 1 and 5 may be implemented as separate hardware modules, or some of the blocks, excluding the decoded image buffer or key frame image buffer, may be implemented as program modules stored in a machine-readable tangible medium such as a read-only memory (ROM) and executed by a central processing unit (CPU) or other computing device, using rewritable memory such as random access memory (RAM) or electronically erasable programmable read-only memory (EEPROM or flash memory).

Those skilled in the art will recognize that further variations are possible within the scope of the invention, which is defined in the appended claims.

What is claimed is:

1. A decoding system receiving error correcting information as coded data representing an original image from an encoding system, the decoding system comprising:
   a predictor for generating a predicted image without using the received error correcting information;
   a decoder for using the error correcting information and correlation information representing an assumed correlation between the predicted image and the original image to perform a multi-stage decoding process that corrects prediction errors in the predicted image and outputting a corrected image at each stage of the multi-stage decoding process;
   a predicted image updater for using the corrected image output in at least one stage of the decoding process to update the predicted image and obtain an updated predicted image; and
   a correlation updater for updating the correlation information after at least one stage of the multi-stage decoding process to obtain updated correlation information and supplying the updated correlation information to the decoder for use in a following stage of the multi-stage decoding process.

2. The decoding system of claim 1, wherein:
the predicted image updater updates the predicted image after each non-final stage of the multi-stage decoding process; and
the correlation updater updates the correlation information after said each non-final stage of the multi-stage decoding process.

3. The decoding system of claim 1, wherein the assumed correlation is an assumed probability distribution of differences between the predicted image and the original image, and the correlation information includes a parameter describing clustering of the differences around zero.

4. The decoding system of claim 3, wherein the correlation updater updates the correlation information by changing the parameter so that the assumed probability distribution of differences clusters more closely around zero.

5. The decoding system of claim 3, wherein the predicted image updater estimates motion vectors, and the correlation updater updates the correlation information by an amount responsive to an amount of change in the motion vectors.

6. The decoding system of claim 3, wherein the predicted image updater performs forward motion compensation and backward motion compensation, and the correlation updater updates the correlation information by an amount responsive to a difference between results of the forward motion compensation and the backward motion compensation.

7. The decoding system of claim 1, wherein the predictor further comprises:
a key frame decoder for decoding key frames to obtain decoded key frame data;
a decoded image buffer for storing the decoded key frame data; and
a side information generator for using the decoded key frame data stored in the decoded image buffer to form the predicted image.

8. The decoding system of claim 1, wherein the decoder performs a turbo decoding process.

9. The decoding system of claim 1, wherein:
the predicted image updater supplies the updated predicted image to the decoder; and
the decoder uses the updated correlation information to correct further prediction errors in the updated predicted image.

10. The decoding system of claim 9, further comprising a decoded image generator for generating a decoded image from the corrected image output in said each stage of the multi-stage decoding process.

11. The decoding system of claim 10, wherein the predicted image updater updates the predicted image if one or both of the following conditions is true:
the decoded image has an image quality equal to or less than a predetermined quality value; and
the decoder has corrected further prediction errors in the updated predicted image less than a predetermined number of times.

12. The decoding system of claim 1, wherein the correlation updater, in updating the correlation information, uses both the predicted image and the updated predicted image.

13. The decoding system of claim 12, wherein the correlation updater, in updating the correlation information, also uses the decoded key frame data stored in the decoded image buffer.

14. The decoding system of claim 1, wherein the predicted image updater and the correlation updater update the predicted image and the correlation information each time the decoder has decoded the predicted image as a whole.

15. The decoding system of claim 1, wherein the predicted image comprises a plurality of bit planes, the decoder decodes the bit planes in separate stages of the multi-stage decoding process, and the predicted image updater and the correlation updater update the predicted image and the correlation information each time the decoder has decoded one of the bit planes.

16. A method of decoding error correcting information received from an encoding system as coded data representing an original image, the method comprising:
generating a predicted image without using the received error correcting information;
using the error correcting information and correlation information representing an assumed correlation between the predicted image and the original image to perform a multi-stage decoding process that corrects prediction errors in the predicted image;
outputting a corrected image at each stage of the multi-stage decoding process;
using the corrected image output in at least one stage of the decoding process to update the predicted image and obtain an updated predicted image; and
updating the correlation information after at least one stage of the multi-stage decoding process to obtain updated correlation information and supplying the updated correlation information to the decoder for use in a following stage of the multi-stage decoding process.

17. The method of claim 16, further comprising generating a decoded image from the corrected predicted image, wherein generating a predicted image further comprises:
decoding key frames to obtain decoded key frame data;
storing the decoded key frame data; and
using the decoded key frame data to form the predicted image.

18. A non-transitory machine readable tangible medium storing instructions executable by a computing device to decode error correcting information received from an encoding system as coded data representing an original image, the instructions including:
instructions for generating a predicted image without using the received error correcting information;
instructions for using the error correcting information and correlation information representing an assumed correlation between the predicted image and the original image to perform a multi-stage decoding process that corrects prediction errors in the predicted image and outputting a corrected image at each stage of the multi-stage decoding process;
instructions for using the corrected image output in at least one stage of the decoding process to update the predicted image and obtain an updated predicted image; and
instructions for updating the correlation information after at least one stage of the multi-stage decoding process to obtain updated correlation information and supplying the updated correlation information to the decoder for use in a following stage of the multi-stage decoding process.

19. The non-transitory machine readable tangible medium of claim 18, wherein the instructions also include instructions for generating a decoded image from the corrected predicted image, and the instructions for generating a predicted image further comprise:
instructions for decoding key frames to obtain decoded key frame data;
instructions for storing the decoded key frame data; and
instructions for using the decoded key frame data to form the predicted image.

* * * * *